United States Patent
Abraham et al.

(10) Patent No.: US 12,370,901 B2
(45) Date of Patent: Jul. 29, 2025

(54) ELECTRIFIED VEHICLE FLAT TOWING SYSTEM AND CONTROL

(71) Applicant: FCA US LLC, Auburn Hills, MI (US)

(72) Inventors: Benjamin M Abraham, Attica, MI (US); Mitchell Johnston, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 190 days.

(21) Appl. No.: 18/357,539

(22) Filed: Jul. 24, 2023

(65) Prior Publication Data

US 2025/0033486 A1    Jan. 30, 2025

(51) Int. Cl.
*B60L 15/20* (2006.01)
*B60L 7/10* (2006.01)
*B60L 58/10* (2019.01)

(52) U.S. Cl.
CPC ............. *B60L 15/20* (2013.01); *B60L 7/10* (2013.01); *B60L 58/10* (2019.02)

(58) Field of Classification Search
CPC ............. B60L 15/20; B60L 58/10; B60L 7/10
See application file for complete search history.

(56) References Cited

U.S. PATENT DOCUMENTS

| | | | |
|---|---|---|---|
| 6,909,363 B2 | 6/2005 | Bell et al. | |
| 7,944,161 B2 | 5/2011 | Hiti et al. | |
| 11,007,894 B2* | 5/2021 | Zenner | B60T 8/323 |
| 11,453,261 B2 | 9/2022 | Marmara et al. | |
| 12,038,074 B1* | 7/2024 | Silbert | B60B 35/14 |
| 2015/0224845 A1* | 8/2015 | Anderson | F03G 7/08 701/37 |
| 2016/0318398 A1 | 11/2016 | Ayala | |
| 2018/0312075 A1* | 11/2018 | Albanna | B60L 53/22 |
| 2021/0323519 A1 | 10/2021 | Robertson | |
| 2022/0281273 A1 | 9/2022 | Ruiz et al. | |
| 2022/0281522 A1 | 9/2022 | Robertson | |

OTHER PUBLICATIONS

John Wayne, "Isolation in High-Voltage Battery Monitoring for Transportation Applications" 2009 Analog Dialogue vol. 43, #4, (Year: 2009).*

Soong, Wen L., "Field-Weakening Performance of Interior Permanent-Magnet Motors", IEEE Transactions on Industry Applications, vol. 38, No. 5, p. 1251-1258. Sep./Oct. 2002.

Zhang, Xiaojun et al., "Robust Control of Winding-Based DC-Bus Capacitor Discharge for PMSM Drives in Electric Vehicles", College of Electrical Engineering, Zhejiang University, Hangzhou 310027, China, p. 123029-123039. Sep. 3, 2021.

* cited by examiner

*Primary Examiner* — Gertrude Arthur Jeanglaude
(74) *Attorney, Agent, or Firm* — Jeremy J. Klobucar

(57) ABSTRACT

A flat towing technique for an electrified vehicle includes in response to a request for and during a flat towing operation, monitoring at least a back electromotive force (EMF) generated by an electric motor of the electrified powertrain, performing field weakening control of the electric motor such that the back EMF generated by the electric motor during the flat towing operation maintains a high voltage bus that powers the electric motor at a target voltage level, selectively isolating a high voltage battery system of the electrified powertrain from the high voltage bus based on a desired capacity of the high voltage battery system, and adjusting the target voltage level for the high voltage bus based on respective lower limits for electric motor speed and high voltage bus voltage and when the high voltage battery system is isolated from the high voltage bus.

18 Claims, 2 Drawing Sheets

ELECTRIFIED VEHICLE FLAT TOWING SYSTEM AND CONTROL

FIELD

The present application generally relates to electrified vehicles and, more particularly, to control systems and methods to enable flat towing of electrified vehicles.

BACKGROUND

Electrified vehicles (EVs) are an increasingly popular type of vehicle. However, many EVs cannot be flat towed like typical internal combustion engine vehicles due to the configuration of their electrified powertrains. Flat towing is the process of towing a vehicle with all wheels still in contact with the road surface. On a conventional vehicle with an engine and transmission, a transfer case could be shifted into neutral or a prop shaft could be temporarily removed to enable flat tow without damaging the engine or transmission. However, flat towing an EV is undesirable because as the wheels spin, an electric motor of the electrified powertrain generates electrical energy which could potentially damage other electrical components or the motor itself. Therefore, EV towing is limited to flatbed towing, which can be costlier than the traditional flat towing methods for internal combustion engine vehicles (e.g., hook and chain). Accordingly, while such electrified vehicle powertrains do work well for their intended purpose, there exists an opportunity for improvement in the relevant art.

SUMMARY

According to one example aspect of the invention, a control system for an electrified powertrain of an electrified vehicle that enables flat towing of the electrified vehicle is presented. In one exemplary implementation, the control system comprises a set of sensors configured to measure a set of parameters of the electrified powertrain relating to at least a back electromotive force (EMF) generated by an electric motor of the electrified powertrain, wherein the electric motor is powered by a high voltage bus of the electrified powertrain and a controller configured to detect a request for a flat towing operation of the electrified vehicle and, in response to the request and during the flat towing operation perform field weakening control of the electric motor such that the back EMF generated by the electric motor during the flat towing operation maintains the high voltage bus at a target voltage level, selectively isolate a high voltage battery system of the electrified powertrain from the high voltage bus based on a desired capacity of the high voltage battery system, and adjust the target voltage level for the high voltage bus based on respective lower limits for electric motor speed and high voltage bus voltage and when the high voltage battery system is isolated from the high voltage bus.

In some implementations, the electric motor is a permanent magnet motor comprising a plurality of permanent magnets that generate a magnetic field and electrical energy corresponding to the back EMF during the flat towing operation of the electrified vehicle. In some implementations, the electric motor is an interior permanent magnet synchronous motor (IPMSM). In some implementations, the controller is configured to adjust the target voltage level for the high voltage bus by determining whether the high voltage bus voltage is at a lower control limit and, when the high voltage bus is at the lower control limit, transitioning from all-open to switching-based control of switches associated with the electric motor until the electric motor speed and the high voltage bus voltage fall below respective lower limits.

In some implementations, the electrified powertrain further comprises a regenerative braking system configured to convert kinetic energy of the electrified vehicle to electrical energy. In some implementations, the controller is configured to connect to a control system of another vehicle performing the flat tow operation via a seven pin trailer or other suitable 12 volt connector. In some implementations, the electrified powertrain does not include a disconnect clutch between the one or more electric motors and a driveline of the electrified vehicle to enable the flat towing operation of the electrified vehicle. In some implementations, the electrified powertrain is not required to shift a transfer case associated with a transmission and an internal combustion engine into a neutral state to enable the flat towing operation of the electrified vehicle. In some implementations, the electrified powertrain is not required to have a propeller shaft removed therefrom to enable the flat towing operation of the electrified vehicle.

According to another example aspect of the invention, a control method for an electrified powertrain of an electrified vehicle that enables flat towing of the electrified vehicle is presented. In one exemplary implementation, the control method comprises detecting, by a controller, a request for a flat towing operation of the electrified vehicle and, in response to detecting the request and during the flat towing operation, receiving, by the controller and from a set of sensors, a set of parameters of the electrified powertrain relating to at least a back EMF generated by an electric motor of the electrified powertrain, wherein the electric motor is powered by a high voltage bus of the electrified powertrain, performing, by the controller, field weakening control of the electric motor such that the back EMF generated by the electric motor during the flat towing operation maintains the high voltage bus at a target voltage level, selectively isolating, by the controller, a high voltage battery system of the electrified powertrain from the high voltage bus based on a desired capacity of the high voltage battery system, and adjusting, by the controller, the target voltage level for the high voltage bus based on respective lower limits for electric motor speed and high voltage bus voltage and when the high voltage battery system is isolated from the high voltage bus.

In some implementations, the electric motor is a permanent magnet motor comprising a plurality of permanent magnets that generate a magnetic field and electrical energy corresponding to the back EMF during the flat towing operation of the electrified vehicle. In some implementations, the electric motor is an IPMSM. In some implementations, adjusting the target voltage level for the high voltage bus further comprises determining, by the controller, whether the high voltage bus voltage is at a lower control limit, and when the high voltage bus is at the lower control limit, transitioning, by the controller, from all-open to switching-based control of switches associated with the electric motor until the electric motor speed and the high voltage bus voltage fall below respective lower limits.

In some implementations, the electrified powertrain further comprises a regenerative braking system configured to convert kinetic energy of the electrified vehicle to electrical energy. In some implementations, the controller is configured to connect to a control system of another vehicle performing the flat tow operation via a seven pin trailer or other suitable 12 volt connector. In some implementations, the electrified powertrain does not include a disconnect clutch between the one or more electric motors and a driveline of the electrified vehicle to enable the flat towing operation of the electrified vehicle. In some implementations, the electrified powertrain is not required to shift a transfer case associated with a transmission and an internal combustion engine into a neutral state to enable the flat towing operation of the electrified vehicle. In some implementations, the electrified powertrain is not required to have a propeller shaft removed therefrom to enable the flat towing operation of the electrified vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
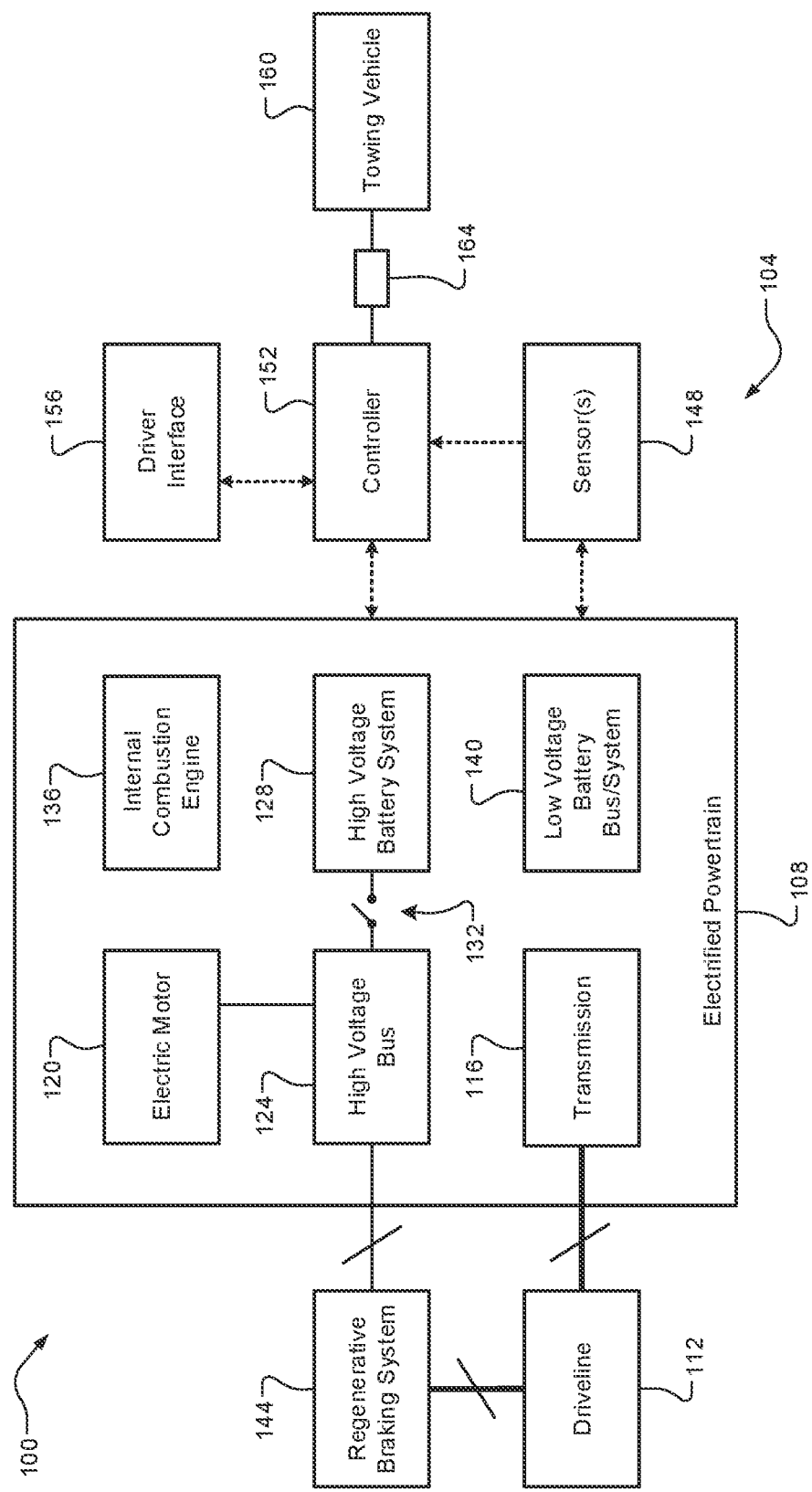
FIG. 1 is a functional block diagram of an electrified vehicle having an example electrified powertrain control system that enables flat towing of the electrified vehicle according to the principles of the present application.

As previously described, many electrified vehicles (EVs) cannot be flat towed like conventional engine/transmission vehicles due to potential damage to their electrified powertrains. This is particularly true for electrified powertrains having a permanent magnet type electric motor (a surface-mounted permanent magnet synchronous motor or 'SPMSM," an interior permanent magnet synchronous motor or "IPMSM," etc.). In contrast to asynchronous induction motors that need to be excited, permanent magnet motors include a plurality of permanent magnets that passively generate magnetic fields. During flat towing, the rotation of the driveline (wheels) and intermediary components causes the permanent magnet motor's rotor to spin, thereby generating a magnetic field and electrical energy. This electrical energy could potentially damage other electrical components or the motor itself if not properly dealt with (stored, expelled, etc.). A disconnect clutch or similar device could be implemented between the permanent magnet motor and the driveline, but this would further increase costs and complexity of the electrified vehicle.

Accordingly, improved control systems and methods for electrified powertrains of electrified vehicles that enable flat towing of the electrified vehicles are presented herein. In addition to enabling flat towing of electrified vehicles, another potential benefit of these systems/methods is avoiding the need for an additional component (a disconnect clutch or similar device) between the driveline and the electric motor of the electrified powertrain. These control techniques of the present application generally involve performing field weakening control of the electric motor during the flat towing operation such that the electrical energy generated by its back electromotive force (EMF) during the towing operation is only utilized to maintain the high voltage bus at a target voltage level based on respective voltage control limits and, in some cases, by closing (operating) at least some motor-related (e.g., power inverter module, or PIM) switches. When the high voltage battery system requires additional charge, however, the high voltage bus could be boosted to a higher target voltage level while isolating the high voltage battery system. In other words, more of the magnetic field's energy could be utilized to generate electrical energy. Malfunctions/faults and other safety signals are continuously monitored and this high voltage bus boosting is abandoned when a corresponding flag is set.

The control systems and methods of the present application are particularly relevant for permanent magnet motors and, more particularly, IPMSMs. Potential benefits of the interior (also known or referred to as "internal" or "buried") permanent magnet designs are (i) generally a reduction in the volume of magnet material needed, (ii) added mechanical structure to support/protect the magnets, and (iii) the ability to effectively employ field weakening. Most designs also include the ability to improve low-speed torque by use of variable reluctance of the rotor in addition to the torque produced using the permanent magnets. The ability to weaken the magnetic field for high-speed operation is used to significantly extend the power and efficiency curves of the motor. This improved performance makes IPMSMs increasingly desirable for improving efficiency, especially when used over a wide range of speeds. In field weakening control, the current is considered as an in-phase (I) and a quadrature-phase (Q) component. These are both oriented to the back-EMF generated by windings on the stator when the rotor is rotated. For three-phase motors, the physical currents are electrically 120 degrees apart, so they must be transformed to equivalent I and Q. Stator/rotor angles require transforming the physical currents into their I and Q components.

Field weaking control is important because the motor generates back-EMF when the motor is in motion, which includes while the vehicle is being flat towed and the driveline is being driven by exterior forces. The magnitude of the back-EMF is proportional to the strength of the magnetic field across the gap and the speed of the motor. The maximum speed of the motor is limited by the ability of the driver to force current into the motor windings. As the motor speed increases, the back EMF increases, and would eventually exceed the driver supply voltage. Using field weakening, the strength of gap field can be reduced, which reduces the back-EMF for a given speed. The lower back-EMF constant (or torque constant) caused by the field weakening thus allows the motor to be run at a higher speed. Typically, this can double available motor speed. The mechanical power available at the output of the motor (including the losses from friction and windage) is the back-EMF times the quadrature portion of the winding current (cross product to be more exact). The main copper loss is the current squared times the resistance. Thus, for a given current, the best efficiency comes when the back-EMF is as large as possible as compared to the resistive current-resistance (I-R) drop. Having the ability to vary the field strength allows the back-EMF to be kept near the maximum (power supply voltage) over a fairly wide range of speeds, which allows the motor efficiency to remain fairly high over a fairly wide range of speeds.

Referring now to FIG. 1, a functional block diagram of an electrified vehicle 100 having an example electrified powertrain control system 104 that enables flat towing of the electrified vehicle 100 according to the principles of the present application is illustrated. It will be appreciated that the electrified vehicle 100 is merely one example configuration and that the techniques of the present application could be applicable to any suitable electrified vehicle (e.g., any hybrid or battery electric vehicle having an IPMSM). The electrified vehicle 100 includes an electrified powertrain 108 that is configured to generate and transfer drive torque to a driveline 112 for vehicle propulsion. The transfer of the drive torque could be, for example, via a multi-speed automatic transmission 116. The electrified powertrain 108 includes an electric motor 120 configured to generate mechanical energy (rotating drive torque) using electrical energy (e.g., current) provided via a high voltage bus 124. In one exemplary implementation, the electric motor 120 is an IPMSM configured for field weakening control, but it will be appreciated that the electric motor 120 may be another suitable type of permanent magnet motor. It will also be appreciated that while a single electric motor 120 is illustrated, the electrified powertrain 108 could include two or more electric motors.

The electrified powertrain 108 further includes a high voltage battery system 128 connected to the high voltage bus 124. A high voltage contactor 132 is connected between the high voltage battery system 128 and the high voltage bus 124 and configured to open/close to selectively isolate the high voltage battery system 128 from the high voltage bus 124. While a contactor-type device 132 is illustrated, it will be appreciated that another suitable type of electrical isolation device could be utilized. The electrified powertrain 108 further includes other components, such as an optional internal combustion engine 136, a low voltage (e.g., 12 volt) battery bus and system 140 (e.g., for powering low voltage accessory components). It will also be appreciated that the electrified powertrain 108 includes other non-illustrated components, such as a DC-DC converter, AC-DC, DC-AC converters, a power inverter module (PIM), and the like. A regenerative braking system 144 is configured to convert kinetic energy of the electrified vehicle 100 to electrical energy, such as for recharging the high voltage battery system 128. A set of one or more sensors 148 are configured to measure various parameter(s) of the electrified powertrain, including at least electrical parameters (voltage, current, etc.) relating to the back EMF generated by the electric motor 120 during a flat towing operation.

A controller 152 is configured to control operation of the electrified vehicle 100, including performing at least a portion of the techniques of the present application. The controller 152 receives the measurements from the sensor(s) 148 as well as driver input via a driver interface 156. Non-limiting examples of the components of the driver interface 156 include an accelerator pedal (indicative of a driver torque request) and a touch screen or physical input device (indicative of a request to enter/exit the flat towing operation for the electrified vehicle 100). The controller 152 is configured to, among other functions, control the electric motor 120 (and, when relevant, the internal combustion engine 136) to generate an amount of drive torque to satisfy the driver torque request. During the flat towing operation, the controller 152 is configured to perform a unique control and monitoring technique of the electrified powertrain 108 that enables the electrified vehicle 100 to be flat towed by another vehicle 160 as described more fully below with respect to FIG. 2. This other vehicle 160 (i.e., the towing vehicle) is in communication with the controller 152 via a conventional seven prong low voltage (e.g., 12 volt) towing connector 164 or another suitable communication connector/interface.

Figure 2:
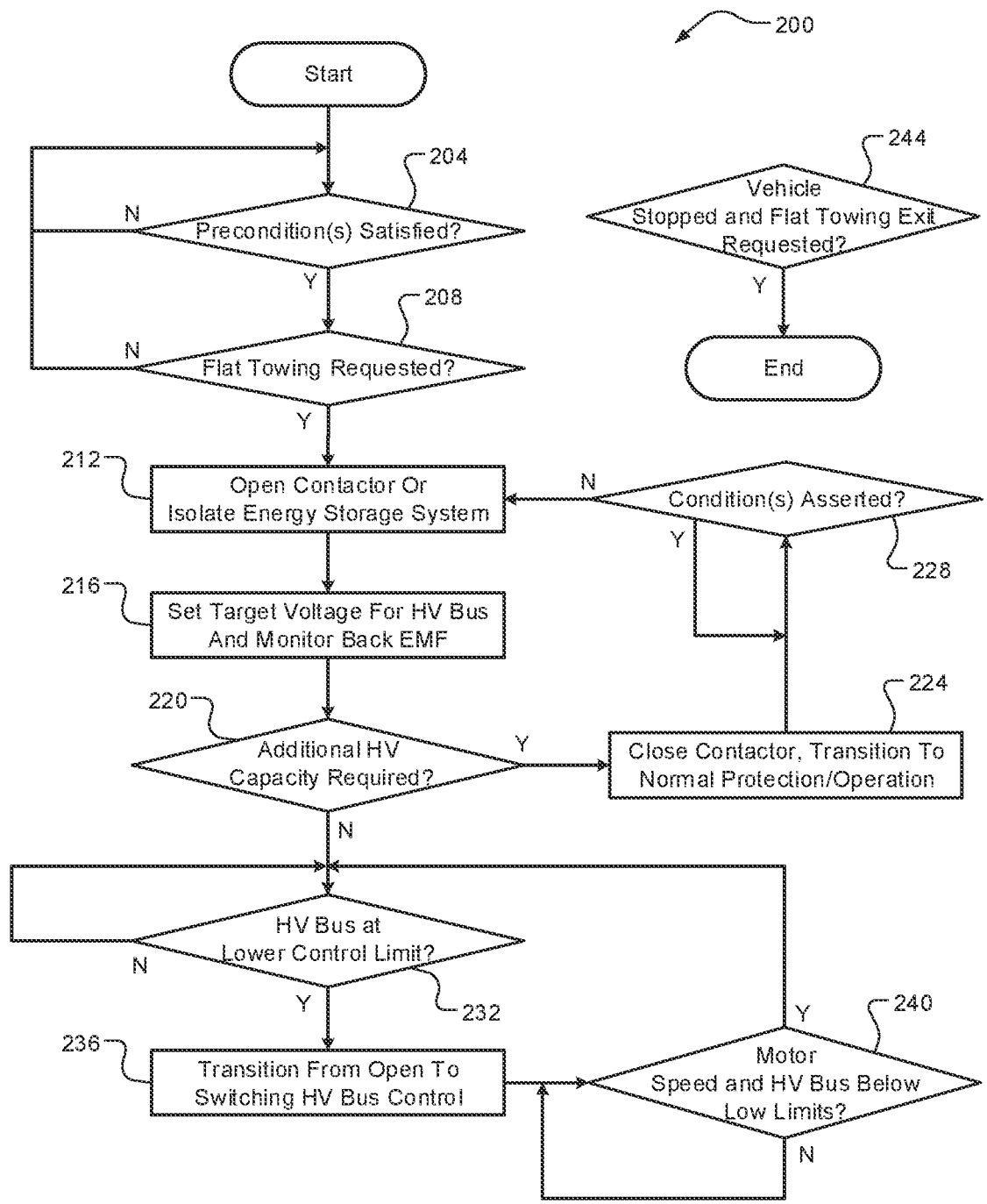
FIG. 2 is a flow diagram of an example control method for an electrified powertrain of an electrified vehicle that enables flat towing of the electrified vehicle according to the principles of the present application.

Referring now to FIG. 2, a flow diagram of an example control method 200 for an electrified powertrain of an electrified vehicle to enable flat towing of the electrified vehicle according to the principles of the present application is illustrated. While the electrified vehicle 100 and its components are specifically referenced for illustrative/descriptive purposes, it will be appreciated that the control method 200 could be applicable to enable towing of any suitable electrified vehicle. At 304, the controller 152 determines whether a set of one or more preconditions are satisfied. This could include, for example only, the electrified vehicle 100 being powered up and there being no malfunctions or faults present that would otherwise affect operation of the method 200. When false, the method 200 ends or returns to 204. When true, the method 200 proceeds to 208. At 208, the controller 152 determines whether a flat towing operation of the electrified vehicle 100 is requested. This could be determined, for example, based on operator inputs via the driver interface 156 (e.g., selecting a flat towing mode). When false, the method 200 continues normal operation of the electrified powertrain 108 and the method 200 ends or returns to 204 or 208. When true, however, the method 200 proceeds to 212. At 212, the controller 152 isolates the high voltage battery system 128 from the high voltage bus 124. This could include, for example, opening contactor 132 or electrically isolating these two electrical systems in another suitable manner. At 216, the controller 152 determines and utilizes a target voltage setpoint for the high voltage bus 124 and monitors back EMF (e.g., using sensor(s) 152). This is also referred to herein as target voltage setpoint control.

At 220, the controller 152 determines whether additional capacity of the high voltage battery system 128 is necessary. This could occur, for example, when the SOC of the high voltage battery system 128 falls below a certain threshold value. When false, the method 200 proceeds to 232. When true, the method 200 proceeds to 224 where the controller 152 exits the target voltage setpoint control and transitions to or returns to normal/protective control of the electrified powertrain 108. This primarily includes deisolating or reconnecting the high voltage battery system 128 and the high voltage bus 124 (e.g., closing contactor 132) and performing field weakening control of the electric motor 120, but it will be appreciated that other actions could be taken (e.g., such as a three-phase short) depending on the current state that is being transitioned from. The method 200 then proceeds to 224. At 224, the controller 152 detects for an event flag for deassertion of the normal/protective control. When false (not detected), the method 200 returns to 224. When true (detected), the method 200 returns to 212. The event flag could be generated, for example, by software and may come from variety of sources including, but not limited to, malfunction or fault detection, driver interface (HMI) requests, and/or vehicle maintenance or safety requests. This state 228 could also be entered from any other state in the flow diagram of the method 200.

At 232, the controller 152 determines whether the high voltage bus 124 is at a lower voltage control limit. When false, the method 200 returns to 232. In other words, the above-described target voltage setpoint control continues. When true, however, the method 200 proceeds to 236 where the controller 152 transitions from full-open control (e.g., six open switches of the PIM associated with the three phases of the electric motor 120) to closing/switching at least some of the switches. This is also described herein as "high side voltage control" and refers to not allowing for regenerative torque to increase the high voltage bus 124 to the target value. This feature will use position control checks to help prioritize (−Id) versus (Iq) for field weakening and, if required. some small amount of motoring torque (+Iq) will be applied to maintain target voltage epically if increase in (−Id) leads to an increase in the high voltage bus 124. Other measurements from the sensor(s) 148 such as AC voltage, current, power factor and so on may also be used to help accomplish this goal. At 240, the controller 152 then determines whether the electric motor speed and high voltage bus 124 are each below respective low speed/voltage limits. When false, the method 200 returns to 236. When true, the method 200 returns to 232. In other words, the motor speed lower limit could be calculated in real time to ensure exiting back into six switch open will not result in damage to any components or increase in the high voltage bus 124 DC voltage.

Further, at any time during the operation of method 200, the controller 152 could perform the check/decision of 244 to determine whether the electrified vehicle 100 is stopped (e.g., brake fully depressed, vehicle speed less than a threshold) and a request to exit the flat towing operation has been received (e.g., by the driver via the driver interface 156). In such cases, the method 200 ends as the flat towing operation has ceased.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A control system for an electrified powertrain of an electrified vehicle that enables flat towing of the electrified vehicle, the control system comprising:
    a set of sensors configured to measure a set of parameters of the electrified powertrain relating to at least a back electromotive force (EMF) generated by an electric motor of the electrified powertrain, wherein the electric motor is powered by a high voltage bus of the electrified powertrain; and
    a controller configured to detect a request for a flat towing operation of the electrified vehicle and, in response to the request and during the flat towing operation:
        perform field weakening control of the electric motor such that the back EMF generated by the electric motor during the flat towing operation maintains the high voltage bus at a target voltage level;
        selectively isolate a high voltage battery system of the electrified powertrain from the high voltage bus based on a desired capacity of the high voltage battery system; and
        adjust the target voltage level for the high voltage bus based on respective lower limits for electric motor speed and high voltage bus voltage and when the high voltage battery system is isolated from the high voltage bus.

2. The control system of claim 1, wherein the electric motor is a permanent magnet motor comprising a plurality of permanent magnets that generate a magnetic field and electrical energy corresponding to the back EMF during the flat towing operation of the electrified vehicle.

3. The control system of claim 2, wherein the electric motor is an interior permanent magnet synchronous motor (IPMSM).

4. The control system of claim 3, wherein the controller is configured to adjust the target voltage level for the high voltage bus by:
    determining whether the high voltage bus voltage is at a lower control limit; and
    when the high voltage bus is at the lower control limit, transitioning from all-open to switching-based control of switches associated with the electric motor until the electric motor speed and the high voltage bus voltage fall below respective lower limits.

5. The control system of claim 1, wherein the electrified powertrain further comprises a regenerative braking system configured to convert kinetic energy of the electrified vehicle to electrical energy.

6. The control system of claim 1, wherein the controller is configured to connect to a control system of another vehicle performing the flat tow operation via a seven pin trailer or other suitable 12 volt connector.

7. The control system of claim 1, wherein the electrified powertrain does not include a disconnect clutch between the one or more electric motors and a driveline of the electrified vehicle to enable the flat towing operation of the electrified vehicle.

8. The control system of claim 1, wherein the electrified powertrain is not required to shift a transfer case associated with a transmission and an internal combustion engine into a neutral state to enable the flat towing operation of the electrified vehicle.

9. The control system of claim 1, wherein the electrified powertrain is not required to have a propeller shaft removed therefrom to enable the flat towing operation of the electrified vehicle.

10. A control method for an electrified powertrain of an electrified vehicle that enables flat towing of the electrified vehicle, the control method comprising:
    detecting, by a controller, a request for a flat towing operation of the electrified vehicle; and
    in response to detecting the request and during the flat towing operation:
        receiving, by the controller and from a set of sensors, a set of parameters of the electrified powertrain relating to at least a back electromotive force (EMF) generated by an electric motor of the electrified powertrain, wherein the electric motor is powered by a high voltage bus of the electrified powertrain;

performing, by the controller, field weakening control of the electric motor such that the back EMF generated by the electric motor during the flat towing operation maintains the high voltage bus at a target voltage level;

selectively isolating, by the controller, a high voltage battery system of the electrified powertrain from the high voltage bus based on a desired capacity of the high voltage battery system; and adjusting, by the controller, the target voltage level for the high voltage bus based on respective lower limits for electric motor speed and high voltage bus voltage and when the high voltage battery system is isolated from the high voltage bus.

11. The control method of claim 10, wherein the electric motor is a permanent magnet motor comprising a plurality of permanent magnets that generate a magnetic field and electrical energy corresponding to the back EMF during the flat towing operation of the electrified vehicle.

12. The control method of claim 11, wherein the electric motor is an interior permanent magnet synchronous motor (IPMSM).

13. The control method of claim 12, wherein adjusting the target voltage level for the high voltage bus further comprises:

determining, by the controller, whether the high voltage bus voltage is at a lower control limit; and when the high voltage bus is at the lower control limit, transitioning, by the controller, from all-open to switching-based control of switches associated with the electric motor until the electric motor speed and the high voltage bus voltage fall below respective lower limits.

14. The control method of claim 10, wherein the electrified powertrain further comprises a regenerative braking system configured to convert kinetic energy of the electrified vehicle to electrical energy.

15. The control method of claim 10, wherein the controller is configured to connect to a control system of another vehicle performing the flat tow operation via a seven pin trailer or other suitable 12 volt connector.

16. The control method of claim 10, wherein the electrified powertrain does not include a disconnect clutch between the one or more electric motors and a driveline of the electrified vehicle to enable the flat towing operation of the electrified vehicle.

17. The control method of claim 10, wherein the electrified powertrain is not required to shift a transfer case associated with a transmission and an internal combustion engine into a neutral state to enable the flat towing operation of the electrified vehicle.

18. The control method of claim 10, wherein the electrified powertrain is not required to have a propeller shaft removed therefrom to enable the flat towing operation of the electrified vehicle.

\* \* \* \* \*